US 9,771,747 B2

(12) United States Patent
Seki et al.

(10) Patent No.: US 9,771,747 B2
(45) Date of Patent: Sep. 26, 2017

(54) DOOR POP-UP SYSTEM

(71) Applicant: AISIN SEIKI KABUSHIKI KAISHA, Kariya-shi (JP)

(72) Inventors: Tomokazu Seki, Kariya (JP); Shintaro Suzuki, Kasugai (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 15/124,591

(22) PCT Filed: Nov. 25, 2014

(86) PCT No.: PCT/JP2014/081077
§ 371 (c)(1),
(2) Date: Sep. 8, 2016

(87) PCT Pub. No.: WO2015/145868
PCT Pub. Date: Oct. 1, 2015

(65) Prior Publication Data
US 2017/0022742 A1   Jan. 26, 2017

(30) Foreign Application Priority Data

Mar. 27, 2014   (JP) .................................. 2014-066024

(51) Int. Cl.
*E05F 11/24*   (2006.01)
*E05F 1/10*   (2006.01)
(Continued)

(52) U.S. Cl.
CPC .............. *E05F 1/1041* (2013.01); *B60J 5/04* (2013.01); *E05B 17/0029* (2013.01);
(Continued)

(58) Field of Classification Search
CPC ........ E05F 1/1041; E05F 15/00; E05C 17/203
(Continued)

(56) References Cited

U.S. PATENT DOCUMENTS 3,061,362 A * 10/1962 Kunimori ............... E05F 15/47
296/146.4
3,129,936 A *  4/1964 Carlson ................... E05F 3/223
49/264
(Continued)

FOREIGN PATENT DOCUMENTS

JP       2008-2085 A     1/2008

OTHER PUBLICATIONS

International Search Report issued Jan. 13, 2015, in PCT/JP2014/081077 filed Nov. 25, 2014.

*Primary Examiner* — Jerry Redman
(74) *Attorney, Agent, or Firm* — Oblon, McClelland, Maier & Neustadt, L.L.P.

(57) ABSTRACT

A door pop-up system includes a check link, which is rotatably coupled to a body of a vehicle, and a pressure member, which is rotatably arranged inside a door. The check link has a tip portion to enter the inside of the door. The pressure member presses a tip of the check link in a movement direction of the check link in which the check link moves as the door in a closed position is actuated to be opened. The door in a closed position is actuated to be opened by rotation of the pressure member and pressing of the tip of the check link with the pressure member. The pressure member has a pressure surface at which the tip of the check link is pressed. The pressure surface has a restriction surface to restrict displacement of the check link in a height direction.

2 Claims, 6 Drawing Sheets

(51) Int. Cl.
*E05B 81/20* (2014.01)
*E05C 17/20* (2006.01)
*E05B 17/00* (2006.01)
*B60J 5/04* (2006.01)
*E05F 15/00* (2015.01)
*E05F 15/611* (2015.01)

(52) U.S. Cl.
CPC .......... *E05B 17/0037* (2013.01); *E05B 81/20* (2013.01); *E05C 17/203* (2013.01); *E05F 1/10* (2013.01); *E05F 1/1025* (2013.01); *E05F 15/00* (2013.01); *E05F 15/611* (2015.01); *E05Y 2900/531* (2013.01)

(58) Field of Classification Search
USPC ...... 49/333, 334, 335, 338; 16/82, 83, 86 A, 16/86 B; 296/146.11, 146.12
See application file for complete search history.

(56) References Cited

U.S. PATENT DOCUMENTS

| | | | |
|---|---|---|---|
| 3,398,484 A * | 8/1968 | Katsumura | E05F 15/622 318/268 |
| 3,653,154 A * | 4/1972 | Hayday | E05F 15/63 192/45.017 |
| 7,500,711 B1 * | 3/2009 | Ewing | E05F 15/622 296/146.1 |
| 7,971,393 B2 * | 7/2011 | Gao | E05F 15/60 16/290 |
| 9,068,388 B2 * | 6/2015 | Costigan | E05F 5/06 |
| 9,080,363 B2 * | 7/2015 | Reed | E05F 5/025 |
| 9,174,517 B2 * | 11/2015 | Scheuring | B60J 5/047 |
| 9,322,204 B2 * | 4/2016 | Suzuki | E05F 15/611 |
| 9,353,566 B2 * | 5/2016 | Miu | E05F 15/611 |
| 2006/0230574 A1 * | 10/2006 | Murayama | E05C 17/203 16/58 |
| 2007/0290796 A1 | 12/2007 | Teshima et al. | |
| 2008/0309120 A1 * | 12/2008 | Kohlstrand | E05D 11/1007 296/146.11 |
| 2011/0266080 A1 * | 11/2011 | Schmitt | E05C 17/006 180/89.1 |
| 2014/0053370 A1 * | 2/2014 | Tseng | E05C 17/203 16/82 |
| 2015/0354259 A1 * | 12/2015 | Broadhead | E05C 17/203 16/82 |

* cited by examiner

DOOR POP-UP SYSTEM

TECHNICAL FIELD

The invention relates to a door pop-up system to actuate a door in a closed position to open the door.

BACKGROUND ART

A vehicle generally has a latch mechanism to retain a door of the vehicle in a fully-closed position. Hence, a user trying to open the door is required to operate a door handle to release the door from the retention by the latch mechanism and then pull the door forward with the door handle. Thus, if the both hands of the user are full of baggage, the user has difficulty in performing operation for opening the door.

According to a controller for a door disclosed in patent document 1, to allow a user to open a door while the both hands of the user are full of baggage, behavior of opening the door is started when the user releases his or her hand from a door handle. Like in this case, it has been desired that a user can perform an operation for opening a door in a simple way even in a situation where the user has difficulty in performing operation for opening the door.

PRIOR ART DOCUMENT

Patent Document

Patent Document 1: Japanese Patent Application Publication No. 2008-2085

SUMMARY OF THE INVENTION

Problems that are to be Solved by the Invention

It is an object of this invention to provide a door pop-up system capable of performing operation for opening a door in a simple way.

Means for Solving the Problem

To solve the aforementioned problem, one aspect of this invention provides a door pop-up system including a link member configured to be rotatably coupled to a body of a vehicle. The link member has a tip portion to enter the inside of a door rotatably coupled to the body and a pressure member rotatably arranged inside the door. The pressure member presses a tip of the link member in a movement direction of the link member in which the link member moves as the door in a closed position is actuated to be opened. In the door pop-up system, the door in a closed position is actuated to be opened by rotation of the pressure member and pressing of the tip of the link member with the pressure member. The pressure member has a pressure surface at which the tip of the link member is pressed. The pressure surface has a restriction surface to restrict displacement of the link member in a direction different from the movement direction of the link member.

According to this structure, when the door is in a state ready to be opened, the door in a closed position can be actuated to be opened by rotating the pressure member and pressing the tip of the link member with the pressure member. Thus, even in a situation where a user finds difficulty in performing an operation for opening the door, the operation for opening the door can be implemented in a simple way. In particular, the restriction surface is formed at the pressure surface of the pressure member at which the tip of the link member is pressed. The presence of the restriction surface can restrict displacement of the link member in a direction different from the movement direction of the link member. This allows the pressure member to press the tip of the link member more reliably in the movement direction of the link member.

In the aforementioned door pop-up system, it is preferable that the restriction surface be formed using a resin material.

This structure can suppress contact sound if both the tip of the link member and the restriction surface are made of metal.

In the aforementioned door pop-up system, it is preferable that the restriction surface be curved in a manner such that the restriction surface surrounds the tip of the link member.

According to this structure, the restriction surface is curved in a manner such that the restriction surface surrounds the tip of the link member. Merely by forming the restriction surface into such an extremely simple shape, displacement of the link member can be restricted.

EMBODIMENTS OF THE INVENTION

First Embodiment

The following describes a first embodiment by referring to FIGS. 1 to 6 that embodies a door pop-up system according to this invention. In the below, the height direction of a vehicle is simply defined as a height direction or a vertical direction. A side inside the vehicle and a side outside the vehicle are simply defined as an inner side and an outer side respectively.

Figure 1:
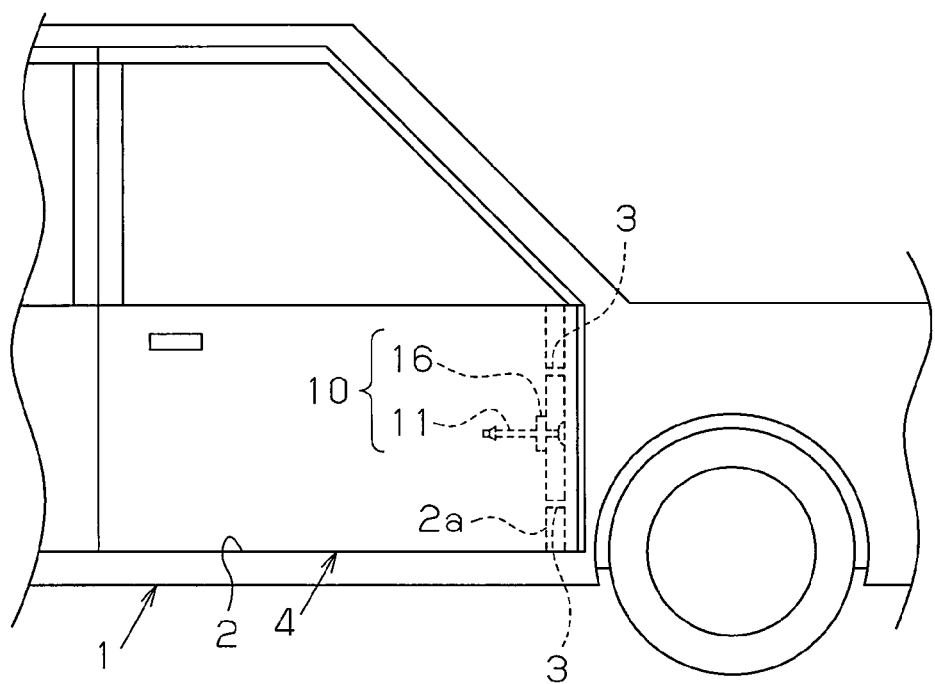
FIG. 1 is a side view showing a vehicle to which a door pop-up system according to a first embodiment of this invention is applied.

As shown in FIG. 1, an opening 2 for getting in and out is formed in a side portion of a body 1 of a vehicle. A door 4 is rotatably coupled to a front edge part 2a of the opening 2 via door hinges 3 in a pair. The door hinges 3 in a pair are aligned in the height direction. The door 4 is opened and closed by rotating around the axis of the door hinge 3.

The front edge part 2a is coupled to a base end portion of a check link 11 as a link member. For example, the check link 11 is formed of a molded material including a metal rod and resin integral with the metal rod and formed into a substantially elongated shape. The check link 11 can rotate in a direction same as a direction in which the door 4 is opened and closed. A door check 16 is fastened to the door 4. The door check 16 lets a tip portion of the check link 11 pass through. The tip portion of the check link 11 is arranged inside the door 4 and is passed through the door check 16 in such a manner as to be movable in the longitudinal direction of the check link 11. The check link 11 and the door check 16 form a door check mechanism 10. The check link 11 swings about the base end portion of the check link 11 in response to actuation for opening and closing the door 4. During this swinging motion, the check link 11 moves in the longitudinal direction of the check link 11 relative to the door check 16 and the door 4.

Figure 2A:
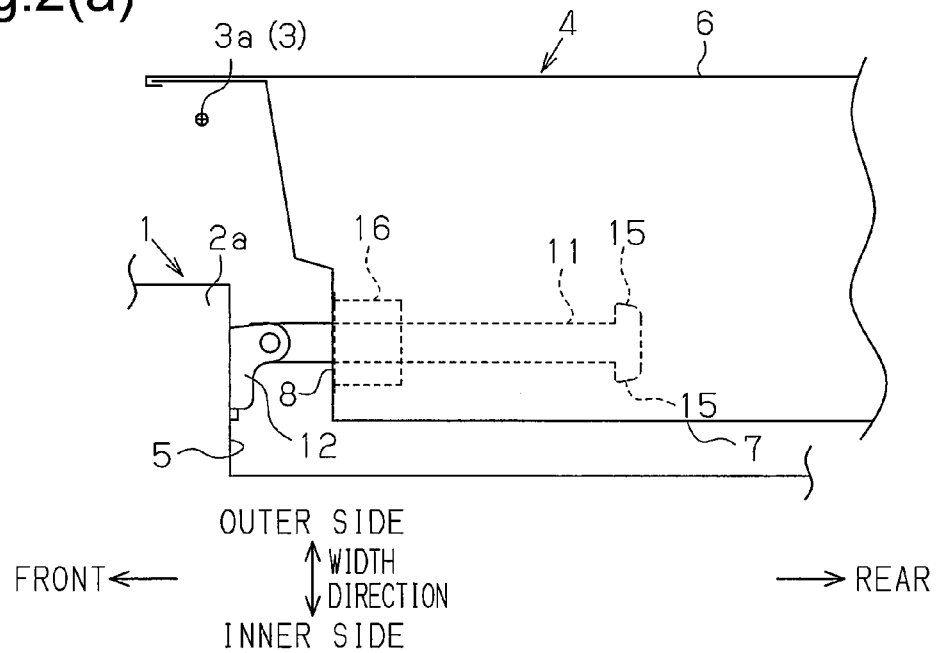
FIGS. 2(a) and 2(b) are plan views each showing the behavior of a check link responsive to opening and closing of a door.
Figure 2B:
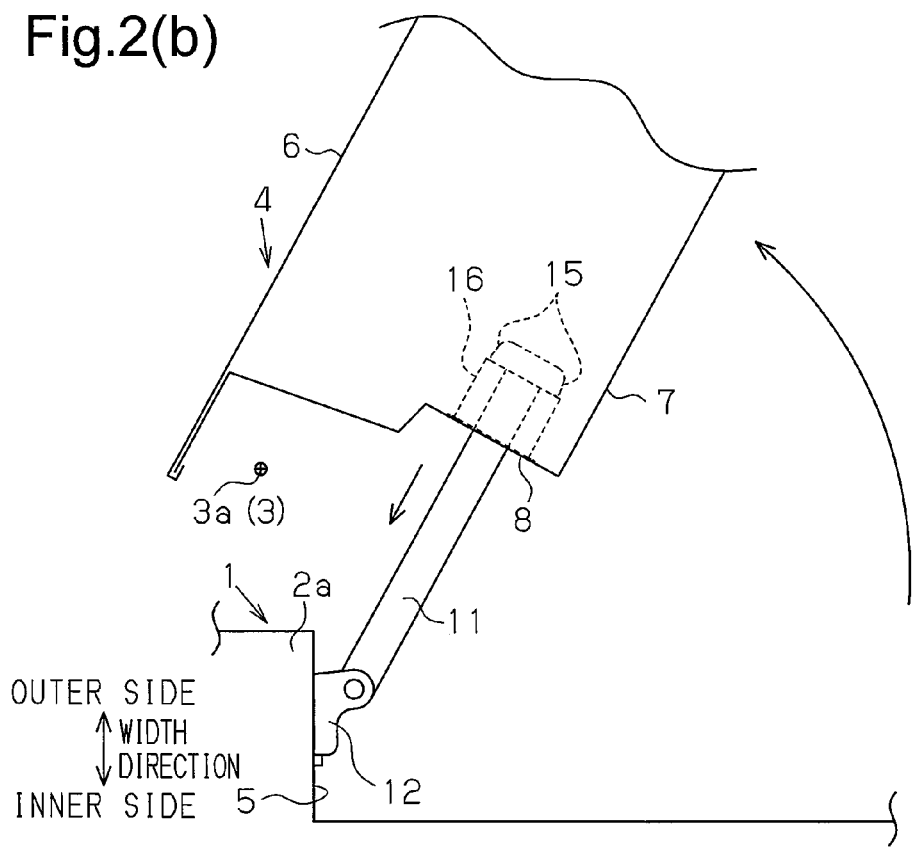

As shown in FIGS. 2(a) and 2(b), the front edge part 2a has an attachment surface 5 of a substantially planar shape recessed inward. A bracket 12 formed of a metal plate is fastened to the attachment surface 5. The door 4 has a door outer panel 6 arranged on the outer side and a door inner panel 7 of a box shape arranged on the inner side. By joining an edge of the door outer panel 6 and an opening end of the door inner panel 7, substantially enclosed space is formed inside the door 4. The door 4 is opened and closed by rotating about a shaft 3a of the door hinge 3.

The base end portion of the check link 11 is coupled to the bracket 12. The check link 11 can rotate around an axis extending in the height direction. The tip portion of the check link 11 penetrates a wall part 8 of the door inner panel 7 facing the attachment surface 5. The door check 16 is fastened to the wall part 8 from the inside of the door 4. When the door 4 is actuated to be opened, the check link 11 passes through the door check 16 to be drawn from the inside of the door 4. When the door 4 is actuated to be closed, the check link 11 passes through the door check 16 to enter the inside of the door 4. Specifically, the position of the check link 11 relative to the door check 16 is determined uniquely according to the position of the door 4 in terms of its opening and closing, specifically, a degree of opening of the door 4. More specifically, as a length L of the check link 11 protruding from the door check 16 toward the inside of the door 4 becomes larger, a degree of opening of the door 4 becomes lower. Conversely, as the length L becomes smaller, a degree of opening of the door 4 becomes higher.

Figure 3:
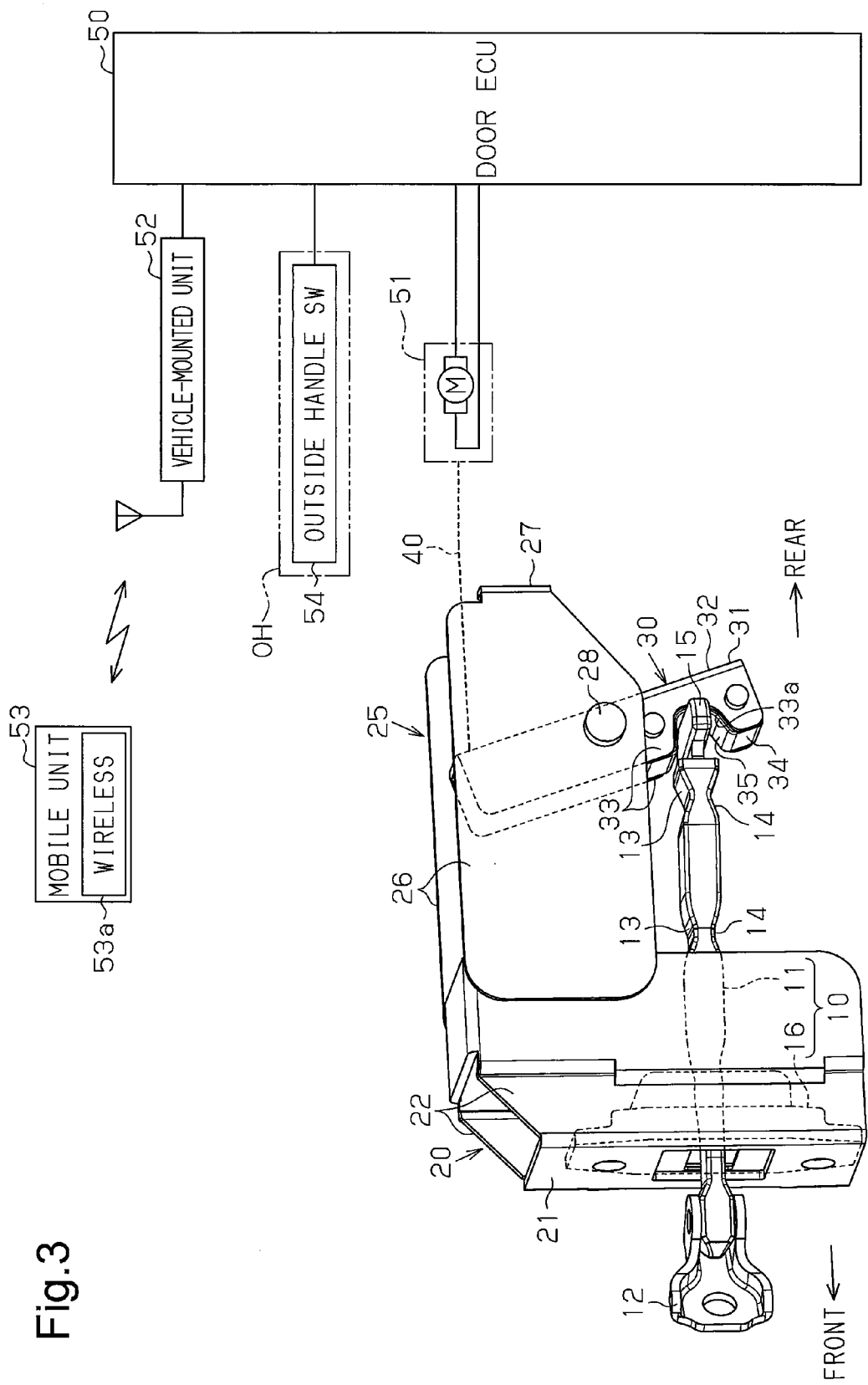
FIG. 3 is a schematic view showing a mechanical and electrical structure to actuate a pressure member.

As shown in FIG. 3, the check link 11 includes a plurality of pairs each formed of an upper valley part 13 and a lower valley part 14. These pairs are formed separately in the longitudinal direction of the check link 11. The door check 16 includes rollers in a pair not shown in the drawings. The rollers in a pair hold any one of the pairs each formed of the upper valley part 13 and the lower valley part 14 therebetween, thereby restricting movement of the check link 11 in the longitudinal direction with light force. Thus, if the movement of the check link 11 in the longitudinal direction is restricted with light force applied from the door check 16, the door 4 is retained in a corresponding position in terms of its opening and closing, specifically, at a corresponding degree of opening with light force.

Stopper parts 15 in a pair protruding in the width direction of a vehicle are provided to the tip of the check link 11. As shown in FIG. 2(b), if the check link 11 passes through the door check 16 to be drawn from the inside of the door 4 as the door 4 is actuated to be opened, the stopper parts 15 abut on the door check 16 to restrict further actuation for opening the door 4. The position of the door 4 in terms of its opening and closing, specifically, a degree of opening of the door 4 shown in FIG. 2(b) is a fully-opened position.

An attachment bracket 20 formed of a metal plate is attached to the wall part 8 of the door 4. The attachment bracket 20 has a substantially strip-shaped attachment wall 21 extending in the height direction, and support walls 22 in a pair extending rearward from opposite side edges of the attachment wall 21. The attachment bracket 20 is formed into a shape like a U-shape opened rearward. With the attachment wall 21 caught between the wall part 8 and the door check 16, the attachment bracket 20 and the door check 16 are fastened together to the wall part 8.

A support bracket 25 formed of a metal plate is fixed to an upper rear portion of the attachment bracket 20. The support bracket 25 has support pieces 26 in a pair, and a connection part 27 connecting the respective rear edges of the opposite support pieces 26. Each support piece 26 is bonded to a corresponding one of the support walls 22 in a pair. Each support piece 26 extends rearward from a corresponding one of the support walls 22 in a pair. The support pieces 26 in a pair are arranged parallel to each other. The support bracket 25 is formed into a shape like a U-shape opened forward.

A pressure member 30 is coupled to the support bracket 25 in a manner such that the pressure member 30 is caught between the support pieces 26. The pressure member 30 can rotate around an axis extending in the width direction of the vehicle. The pressure member 30 has a plate member 31 formed of a metal plate. The plate member 31 has a substantially strip-shaped bottom wall 32 extending in the height direction, and side walls 33 in a pair extending forward from opposite side edges of the bottom wall 32. The plate member 31 is formed into a shape like a U-shape opened forward. The plate member 31 is rotatably supported on the support bracket 25 via a support pin 28. The support pin 28 has an axis extending in the width direction of a vehicle. The support pin 28 penetrates respective intermediate portions of the opposite support pieces 26 and respective intermediate portions of the opposite side walls 33.

A lower end portion of each side wall 33 is arranged below the support bracket 25. The lower end portion of each side wall 33 has a cutout 33a of a substantially embayed shape recessed rearward from the front end of the side wall 33. The pressure member 30 has a filler part 34 made of resin formed at the cutout 33a. The filler part 34 is formed by pouring resin between the opposite side walls 33. The front end surface of the filler part 34 is formed into the same shape as the cutout 33a. The front end surface of the filler part 34 and the opposite cutouts 33a form a restriction surface 35 together. The restriction surface 35 maintains a cross-sectional shape viewed in the width direction of a vehicle at a constant cross-sectional shape. The restriction surface 35 is arranged to face the check link 11 to enter the inside of the door 4 through the door check 16, specifically, the restriction surface 35 is arranged to face the opposite stopper parts 15. This allows the restriction surface 35 to abut on the rear end of the check link 11.

A terminal of a cable 40 is rotatably coupled to an upper end portion of the side wall 33 of the pressure member 30. The cable 40 is stretched to extend rearward from the upper end portion of the side wall 33. Thus, pulling the cable 40 rearward makes the pressure member 30 rotate around the support pin 28 in a clockwise direction shown in FIG. 3.

An electrical structure relating to actuation of the pressure member 30 is described next by referring to FIG. 3.

As shown in FIG. 3, a door ECU (Electronic Control Unit) 50 is installed in the door 4. The door ECU 50 is mainly formed of a microcontroller (MCU). The door ECU 50 is electrically connected to a pop-up motor 51 installed in the door 4. The pop-up motor 51 is configured to pull the cable 40.

The door ECU 50 is electrically connected to a vehicle-mounted unit 52 installed on the body 1. The vehicle-mounted unit 52 makes radio communication with an electronic key 53 as a mobile unit carried by a user. The vehicle-mounted unit 52 makes bidirectional communication with the mobile unit 53 to conduct ID authentication by checking an ID code. The vehicle-mounted unit 52 transmits a result of the check of the ID code to the door ECU 50. Further, the vehicle-mounted unit 52 receives a transmission signal output based on the pressing of a wireless switch 53a of the mobile unit 53, and transmits the received signal to the door ECU 50. The door ECU 50 controls drive of the pop-up motor 51 based on the signal from the vehicle-mounted unit 52.

The door ECU 50 is further electrically connected to an outside handle switch 54 installed on an outside door handle OH. When the outside door handle OH is operated, an operation signal is output from the outside handle switch 54. The door ECU 50 controls drive of the pop-up motor 51 based on the operation signal from the outside handle switch 54.

The action of the pop-up system according to the first embodiment is described next by referring to FIGS. 3 to 6.

As shown in FIG. 3, in a state the door 4 is in a fully-closed position, the rear end of the check link 11 and the respective rear ends of the opposite stopper parts 15, having entered the inside of the door 4 through the door check 16, are in abutting contact with or close to the restriction surface 35 of the pressure member 30 released from driving force applied from the pop-up motor 51. When the outside door handle OH is operated in this state, the door 4 is released from a latch mechanism not shown in the drawings for retaining the door 4 in a fully-closed position. Next, the door ECU 50 drives the pop-up motor 51 to pull the cable 40 rearward.

Figure 4:
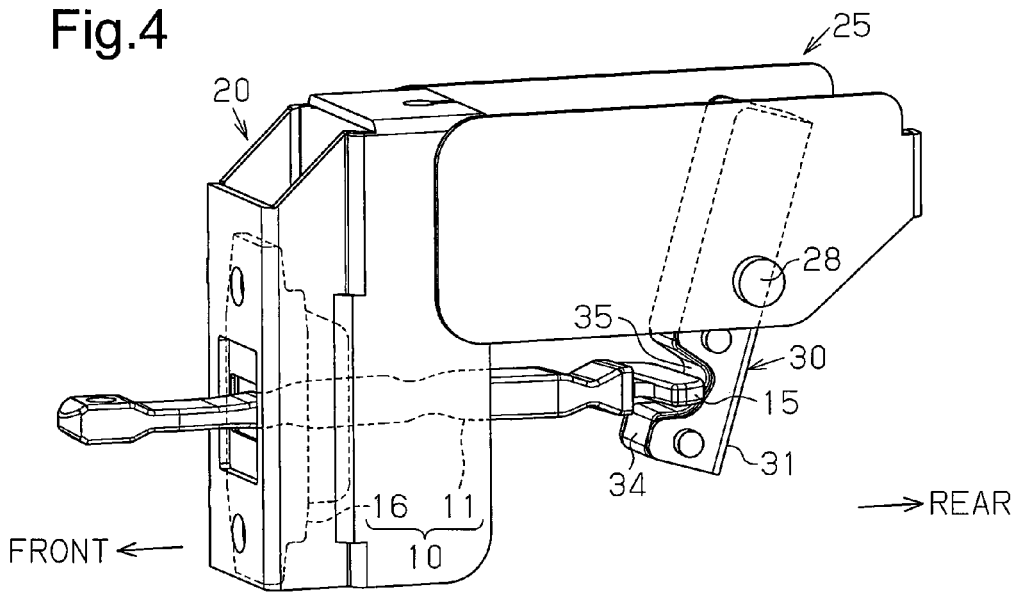
FIG. 4 is a schematic view showing a mechanical structure to actuate the pressure member.

At this time, as shown in FIGS. 3 and 4, the pressure member 30 rotates about the support pin 28 in a clockwise direction shown in FIGS. 3 and 4. In response to this rotation, a lower end portion of the pressure member 30 and the restriction surface 35 move forward. Thus, the check link 11 is pressed with the pressure member 30 to move forward relative to the door check 16 by a distance corresponding to a distance of the movement of the pressure member 30. In this way, the door 4 is pop-up actuated to be opened to a degree of opening corresponding to the distance of the forward movement of the check link 11.

Figure 5:
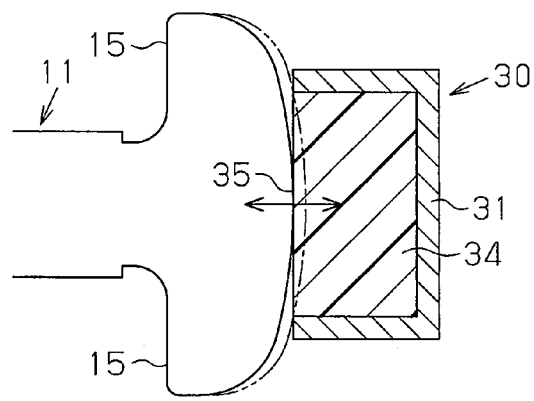
FIG. 5 is a plan view showing a position of abutment between the check link and the pressure member.

For example, in response to the forward movement of the check link 11 and the swinging motion of the check link 11, a position of abutment between the check link 11 and the pressure member 30 may be displaced. In this regard, as shown in FIG. 5, the restriction surface 35 is formed by providing the filler part 34 made of resin between the opposite side walls 33 of the plate member 31 formed of a metal plate. Further, the restriction surface 35 is formed in such a manner as to maintain a cross-sectional shape viewed in the width direction of a vehicle at a constant cross-sectional shape. As a result of these, it becomes unlikely that a state of the abutment between the rear end of the check link 11 and the pressure member 30 will be changed seriously. Additionally, a position of the abutment between the rear end of the check link 11 and the pressure member 30 can be maintained in a range of the filler part 34 made of resin. A two-dot chain line of FIG. 5 shows the position of the rear end of the check link 11 abutting on the plate member 31 without the filler part 34. As clearly seen from FIG. 5, in the absence of the filler part 34, the pressure member 30 is to abut on the opposite side walls 33 of the plate member 31. In this case, the position of the check link 11 is displaced by entry of the rear end of the check link 11 into a gap between the opposite side walls 33.

Figure 6:
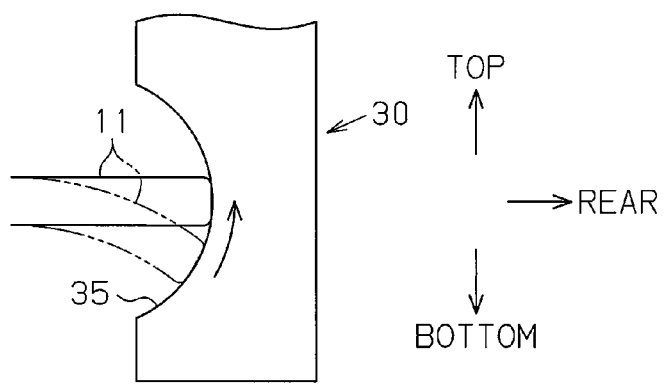
FIG. 6 is a side view showing a position of abutment between the check link and the pressure member.

Further, as shown in FIG. 6, the restriction surface 35 is curved in such a manner as to surround the rear end of the check link 11 in each of directions from above, from below, and from the rear. Thus, as shown by a two-dot chain line of FIG. 6, the rear end of the check link 11 to be displaced in the height direction different from the movement direction of the check link 11 can be restricted on the restriction surface 35. More specifically, the rear end of the check link 11 to be displaced in the height direction is guided along the curved surface of the restriction surface 35. This can return the rear end of the check link 11 to its initial position before displacement of the check link 11 occurs. Specifically, even if the check link 11 moves forward to displace the position of the check link 11 in the vertical direction, the rear end of the check link 11 can still be returned to its initial position. In this way, it becomes unlikely that a state of the abutment between the rear end of the check link 11 and the restriction surface 35 will be changed seriously. Specifically, the pressure member 30 can press the rear end of the check link 11 more reliably in the movement direction of the pressure member 30.

Thus, the first embodiment achieves the following effects.

(1) When the door 4 is in a state ready to be opened, the door 4 in a closed position can be actuated to be opened by rotating the pressure member 30 and pressing the rear end of the check link 11 with the pressure member 30. Thus, even in a situation where a user finds difficulty in performing an operation for opening the door 4, the operation for opening the door 4 can be performed in a simple way. In particular, the restriction surface 35 is formed at a pressure surface of the pressure member 30 at which the rear end of the check link 11 is pressed. The restriction surface 35 can restrict displacement of the position of the check link 11 in the height direction. This allows the pressure member 30 to press the rear end of the check link 11 more reliably in the movement direction of the check link 11. Thus, force applied from the pressure member 30 can be transmitted more reliably to the check link 11. The force applied from the pressure member 30 can also function to suppress deformation of the check link 11.

(2) The restriction surface 35 is mainly formed of a resin material. This can suppress contact sound if both the rear end of the check link 11 and the restriction surface 35 are made of metal.

(3) The restriction surface 35 is curved in such a manner as to surround the rear end of the check link 11. Only by forming the restriction surface 35 into such an extremely simple shape, displacement of the check link 11 can be restricted.

Second Embodiment

The following describes a second embodiment by referring to FIGS. 7 to 10 that embodies the door pop-up system according to this invention. The second embodiment differs from the first embodiment in that a structure of the second embodiment employs a non-electrical system in the absence of a pop-up motor, and the like. A part of the second embodiment comparable to that of the first embodiment will not be described in detail.

Figure 7:
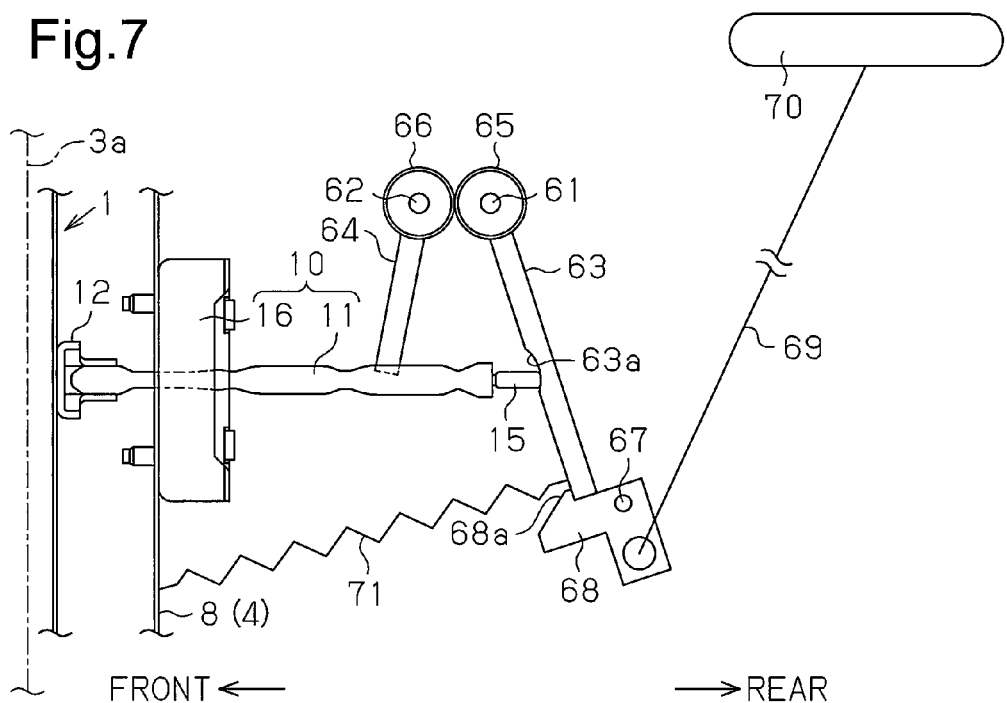
FIG. 7 is a side view schematically showing the structure of a door pop-up system according to a second embodiment of this invention.

As shown in FIG. 7, a first gear 65 and a second gear 66 in meshing engagement with each other are rotatably supported in the door 4. The first and second gears 65 and 66 are arranged above the check link 11 and rotate about a rotary shaft 61 and a rotary shaft 62 respectively. The respective axes of the rotary shafts 61 and 62 extend in the width direction of a vehicle and parallel to each other. The first and second gears 65 and 66 are coupled to a first lever 63 and a second lever 64 respectively functioning as rod-like pressure members. The first lever 63 rotates together with the first gear 65. The second lever 64 rotates together with the second gear 66.

The upper end of the first lever 63 is fixed to the first gear 65. The lower end of the first lever 63 is arranged behind and below the check link 11. A restriction surface 63a is formed at an intermediate portion of the first lever 63 in its longitudinal direction. The restriction surface 63a is formed into a substantially curved shape recessed rearward from the front surface of the first lever 63. The restriction surface 63a maintains a cross-sectional shape viewed in the width direction of a vehicle at a constant cross-sectional shape. The restriction surface 63a is arranged to face the check link 11 to enter the inside of the door 4 through the door check 16. This allows the restriction surface 63a to abut on the rear end of the check link 11.

The upper end of the second lever 64 is fixed to the second gear 66. The stopper part 15 is fixed to one end portion of the check link 11. The lower end of the second lever 64 is arranged at the same height as the check link 11 and in front of the stopper part 15. The lower end of the second lever 64 is arranged to face the stopper part of the check link 11 to be drawn from the inside of the door 4 through the door check 16. This allows the lower end of the second lever 64 to abut on the stopper part 15.

A substantially L-shaped pole 68 is coupled in the door 4. The pole 68 can rotate about a rotary shaft 67 arranged behind and below the check link 11 and extending in the width direction of a vehicle. The pole 68 is coupled through a cable 69 to a door handle 70. A substantially triangular engagement pawl 68a is formed at the tip of the pole 68. A tension spring 71 formed of a coil spring is arranged between the wall part 8 and the first lever 63. The tension spring 71 has one end engaged with the wall part 8 and the opposite end engaged with the first lever 63. The tension spring 71 biases the first lever 63 in a direction in which the first lever 63 rotates about the rotary shaft 61 in a clockwise direction shown in FIG. 7. Thus, when the first lever 63 rotates in an anticlockwise direction to be separated from the check link 11, the tension spring 71 expands. In this way, biasing force acting in a direction in which the tension spring 71 contracts is accumulated in the tension spring 71.

The lower end of the first lever 63 is latched with the engagement pawl 68a of the pole 68 to restrict the rotation of the first lever 63 resulting from the biasing force of the tension spring 71. Specifically, the pole 68 can retain the first lever 63 while the tension spring 71 is in a given state where biasing force is accumulated in the tension spring 71. When the cable 69 is pulled in response to operation on the door handle 70 to release the latch mechanism, the pole 68 rotates about the rotary shaft 67 in an anticlockwise direction shown in FIG. 8 to release the first lever 63 from the latch with the engagement pawl 68a. When the door handle 70 is released from the operational force, the pole 68 is returned by a release spring not shown in the drawings to its initial position before the operation is preformed.

Action of the pop-up system according to the second embodiment is described next by referring to FIGS. 7 to 10.

When the door 4 is in a fully-closed position, the pole 68 is arranged in its initial position, as shown in FIG. 7. In this state, the lower end of the first lever 63 is latched with the engagement pawl 68a of the pole 68. Thus, the rotation of the first lever 63 is restricted. Further, the rear end of the check link 11 and the respective rear ends of the opposite stopper parts 15, having entered the inside of the door 4 through the door check 16, are in abutting contact with or close to the restriction surface 63a of the first lever 63. The lower end of the second lever 64, which is coupled to the first lever 63 through the first and second gears 65 and 66, is arranged in a position in front of and separated from the stopper part 15.

Figure 8:
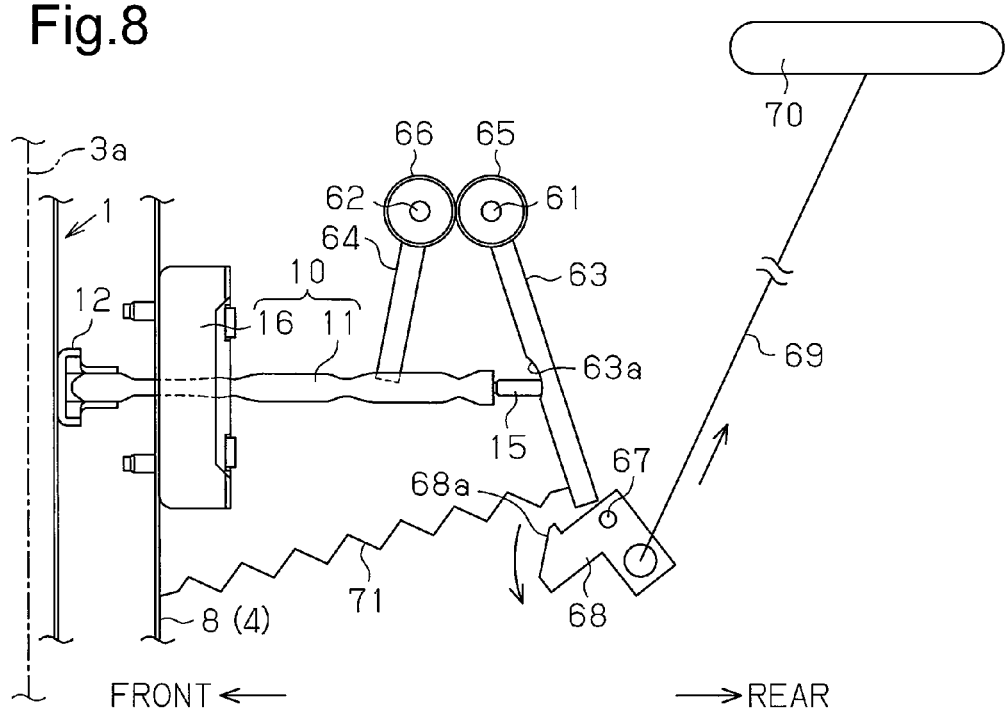
FIG. 8 is a side view schematically showing the behavior of the door pop-up system.
Figure 9:
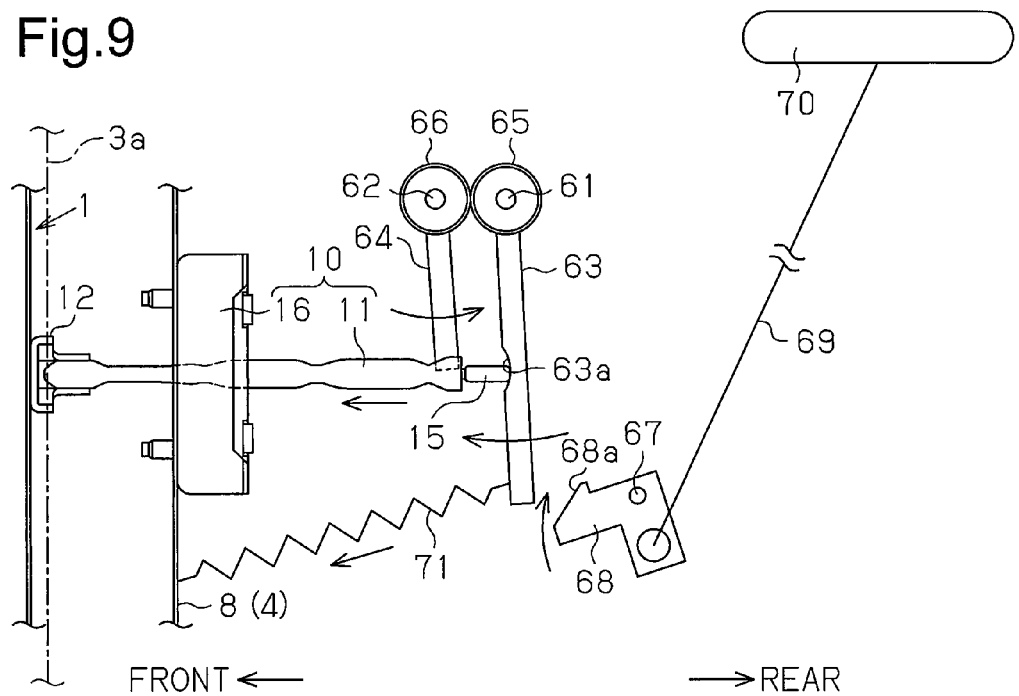
FIG. 9 is a side view schematically showing the behavior of the door pop-up system.

As shown in FIG. 8, the cable 69 is pulled in response to operation on the door handle 70. This makes the pole 68 rotate about the rotary shaft 67 in an anticlockwise direction shown in FIG. 8. In this way, the lower end of the first lever 63 is released from the latch with the engagement pawl 68a. At this time, the latch mechanism is released in response to the operation on the door handle 70. Then, as shown in FIG. 9, the first lever 63 is biased by the tension spring 71 to rotate about the rotary shaft 61 in a clockwise direction shown in FIG. 9. In response, the position of the intermediate portion of the first lever 63 in its longitudinal direction, specifically, the position of the restriction surface 63a moves forward. Thus, the check link 11 is pressed with the first lever 63 to move forward relative to the door check 16 by a distance corresponding to a distance of the movement of the restriction surface 63a. In this way, the door 4 is pop-up actuated to be opened to a degree of opening corresponding to the distance of the forward movement of the check link 11.

When the first gear 65 rotates together with the first lever 63, the second gear 66 in meshing engagement with the first gear 65 rotates together with the second lever 64 about the rotary shaft 62 in an anticlockwise direction shown in FIG. 9. At this time, the rear end of the stopper part 15 of the check link 11 is pressed with the first lever 63 and the restriction surface 63a to move forward. At the same time, the second lever 64 rotates in such a manner as to make the lower end of the second lever 64 go closer to the stopper part 15 of the check link 11.

Figure 10:
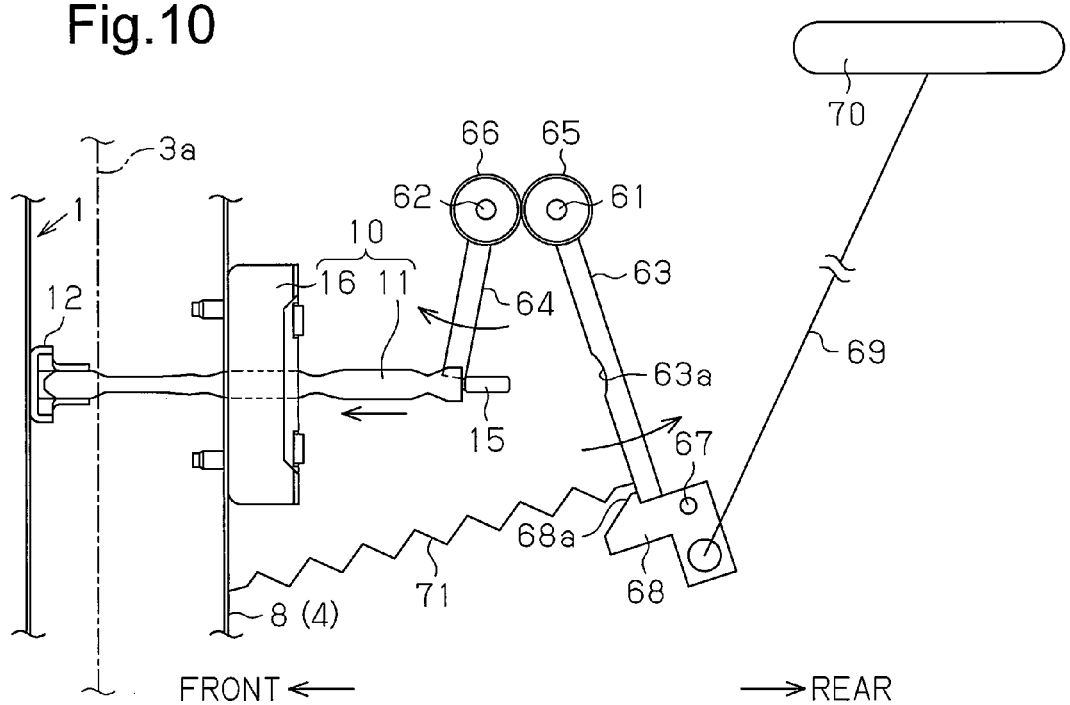
FIG. 10 is a side view schematically showing the behavior of the door pop-up system.

The following describes how operation is performed manually for opening the door 4 further after the door 4 is actuated to be opened in response to pressing of the check link 11 with the first lever 63. In this case, as shown in FIG. 10, the lower end of the second lever 64 is pressed with the stopper part 15 of the check link 11 moving forward relative to the door check 16. This makes the second lever 64 rotate about the rotary shaft 62 in a clockwise direction shown in FIG. 10. When the second gear 66 rotates together with the second lever 64, the first gear 65 in meshing engagement with the second gear 66 rotates together with the first lever 63 about the rotary shaft 61 in an anticlockwise direction shown in FIG. 10 while resisting the biasing force of the tension spring 71. This makes the lower end of the first lever 63 reach the pole 68 having been returned to its initial position. Then, the lower end of the first lever 63 is latched with the engagement pawl 68a of the pole 68 to restrict the rotation of the first lever 63. Meanwhile, if the lower end of the second lever 64 deviates from a track of movement of the stopper part 15 of the check link 11, the rotation of the second lever 64 is stopped. Then, the first and second levers 63 and 64 are returned to their original states before the operation on the door handle 70 is performed.

The following describes how operation is performed manually for fully opening the door 4. The check link 11 continues moving forward until the opposite stopper parts 15 abut on the door check 16. At this time, the opposite stopper parts 15 pass below the second lever 64 without interfering with the second lever 64. During operation for closing the door 4 manually in a fully-opened position, the check link 11 moves rearward. At this time, the opposite stopper parts 15 move rearward while passing below the second lever 64 without interfering with the second lever 64. If the door 4 reaches a fully-closed position, the check link 11, and the first and second levers 63 and 64 are returned to their states shown in FIG. 7.

Thus, the second embodiment achieves the following effect in addition to the effects (1) and (3) achieved by the first embodiment.

(1) The door 4 can be pop-up actuated mechanically, not electrically. This eliminates the need for the pop-up motor 51, and the like, thereby allowing reduction in manufacturing cost.

Each of the aforementioned embodiments can be changed as follows.

In the first embodiment, the restriction surface (35) of the pressure member 30 may be curved in such a manner as to surround the rear end of the check link 11 from the inner side, from the outer side, and from the rear.

In the first embodiment, the axis of the pressure member (30) may extend in the height direction. In this case, the restriction surface (35) of the pressure member may be curved in such a manner as to surround the rear end of the check link 11 from above, from below, and from the rear, or from the inner side, from the outer side, and from the rear.

In the first embodiment, the pressure member (30) may be formed of a rod member or a plate member. Further, the restriction surface (35) may be formed by cutting a part of the rod member or a part of the plate member.

In the first embodiment, the pressure member 30 may be returned to its initial position shown in FIG. 3, specifically, a rotation position before the door 4 is pop-up actuated by stopping the pop-up motor 51 and releasing the cable 40. Further, the pressure member 30 may alternatively be returned to its initial position by providing a stopper to restrict the rotation of the pressure member 30 mechanically and a release spring to bias the pressure member 30 toward a position in which the rotation of the pressure member 30 is restricted.

In the first embodiment, an electrical switch used for the pop-up actuation of the door 4 may be a switch installed on a dashboard to face a driver's seat, or an inside handle switch installed on an inside door handle.

In the second embodiment, the restriction surface (63*a*) of the first lever 63 may be curved in such a manner as to surround the rear end of the check link 11 from the inner side, from the outer side, and from the rear.

In the second embodiment, an axis such as that of the first lever (63) may extend in the height direction. In this case, the restriction surface (63*a*) of the first lever may be curved in such a manner as to surround the rear end of the check link 11 from above, from below, and from the rear, or from the inner side, from the outer side, and from the rear.

In the second embodiment, the restriction surface (63*a*) of the first lever 63 may be formed of a resin material.

The pole (68) employed in the second embodiment may be engaged with and removed from the first lever 63 in response to sliding motion.

In the second embodiment, the first and second levers 63 and 64 may be interlocked by pulleys in a pair and a belt stretched between these pulleys instead of the first and second gears 65 and 66.

In the second embodiment, the tension spring 71 may be replaced by an elastic body such as rubber, an air pressure cylinder, or a hydraulic cylinder.

In each of the embodiments, the latch mechanism to act before the pop-up actuation of the door 4 may be released mechanically or electrically using an electrical motor. The latch mechanism may be released by a dedicated electric motor or by the pop-up motor 51.

In each of the embodiments, the pop-up actuation of the door 4 is achieved by using the check link 11 of the door check mechanism 10. A dedicated link member operating in the same way may be employed for the pop-up actuation.

This invention may be applied to a door provided in the rear of a vehicle.

The invention claimed is:

1. A door pop-up system comprising:
a link member configured to be rotatably coupled to a body of a vehicle, the link member having a tip portion to enter an inside of a door, which is rotatably coupled to the body; and
a pressure member rotatably arranged inside the door, wherein the pressure member presses the tip portion of the link member in a movement direction of the link member in which the link member moves as the door in a closed position is actuated to be opened, wherein
the door in a closed position is actuated to be opened by rotation of the pressure member and pressing of the tip portion of the link member with the pressure member,
the pressure member has a pressure surface at which the tip portion of the link member is pressed, and
the pressure surface has a restriction surface to restrict displacement of the link member in a direction different from the movement direction of the link member,
wherein the restriction surface is formed using a resin material.

2. A door pop-up system comprising:
a link member configured to be rotatably coupled to a body of a vehicle, the link member having a tip portion to enter an inside of a door, which is rotatably coupled to the body; and
a pressure member rotatably arranged inside the door, wherein the pressure member presses the tip portion of the link member in a movement direction of the link member in which the link member moves as the door in a closed position is actuated to be opened, wherein
the door in a closed position is actuated to be opened by rotation of the pressure member and pressing of the tip portion of the link member with the pressure member,
the pressure member has a pressure surface at which the tip portion of the link member is pressed, and
the pressure surface has a restriction surface to restrict displacement of the link member in a direction different from the movement direction of the link member,
wherein the restriction surface is curved in a manner such that the restriction surface surrounds the tip portion of the link member.

* * * * *